US 10,326,174 B2

(12) United States Patent
Kamada et al.

(10) Patent No.: US 10,326,174 B2
(45) Date of Patent: Jun. 18, 2019

(54) BATTERY PACK (71) Applicant: Maxell Holdings, Ltd., Otokuni-gun, Kyoto (JP)

(72) Inventors: Tatsuya Kamada, Osaka (JP); Naoaki Ogino, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 80 days.

(21) Appl. No.: 14/909,409

(22) PCT Filed: Jul. 30, 2014

(86) PCT No.: PCT/JP2014/070113
§ 371 (c)(1),
(2) Date: Feb. 1, 2016

(87) PCT Pub. No.: WO2015/029684
PCT Pub. Date: Mar. 5, 2015

(65) Prior Publication Data
US 2016/0197381 A1    Jul. 7, 2016

(30) Foreign Application Priority Data
Aug. 28, 2013   (JP) .................................. 2013-176961

(51) Int. Cl.
*H01M 10/42* (2006.01)
*H01M 2/10* (2006.01)
(Continued)

(52) U.S. Cl.
CPC ..... *H01M 10/4257* (2013.01); *H01M 2/1016* (2013.01); *H01M 2/202* (2013.01);
(Continued)

(58) Field of Classification Search
CPC ............... H01M 2/1016; H01M 2/202; H01M 10/4257; H01M 10/486; H01M 2/34; H01M 2010/4271; H01M 2/348; H01M 10/482
(Continued)

(56) References Cited

U.S. PATENT DOCUMENTS 6,146,778 A  *  11/2000  Rouillard ............ H01M 2/1077
                                                                361/434
2011/0101917 A1 *  5/2011  Doh .................. H01M 10/4207
                                                                320/116
(Continued)

FOREIGN PATENT DOCUMENTS

JP    2001-511586 A    8/2001
JP    2009-130260 A    6/2009
(Continued)

OTHER PUBLICATIONS

International Search Report, issued in PCT/JP2014/070113, dated Sep. 16, 2014.
(Continued)

*Primary Examiner* — Cynthia H Kelly
*Assistant Examiner* — Omar M Kekia
(74) *Attorney, Agent, or Firm* — Birch, Stewart, Kolasch & Birch, LLP (57) ABSTRACT

A battery pack (1) includes: a battery stack (20) in which a plurality of laminar battery cells (10) are connected in series; a voltage monitoring unit (3) that monitors the voltage of each battery cell; a power unit (4) that has power lines (41*p*, 41*n*) for connecting the battery stack (20) and external connection terminals (42*p*, 42*n*), a current monitoring unit (44) for monitoring the current of the power lines, and a switch (43) for disconnecting the power lines; and a control unit (5) that receives signals from the voltage monitoring
(Continued)

unit and the current monitoring unit, and outputs to the switch a signal for shutting off the power line. The power unit (4) is provided on a power board (74) separately from boards (73, 75) on which the voltage monitoring unit (3) and the control unit (5) are provided. Wiring formed on the power board (74) is thicker than that formed on the boards (73, 75) on which the voltage monitoring unit and the control unit are provided.

7 Claims, 8 Drawing Sheets

(51) Int. Cl.
    *H01M 2/20*     (2006.01)
    *H01M 10/48*     (2006.01)
    *H01M 2/34*     (2006.01)

(52) U.S. Cl.
    CPC ........... *H01M 2/34* (2013.01); *H01M 10/482* (2013.01); *H01M 2/348* (2013.01); *H01M 10/486* (2013.01); *H01M 2010/4271* (2013.01)

(58) Field of Classification Search
    USPC .......................................................... 429/61
    See application file for complete search history.

(56) References Cited

U.S. PATENT DOCUMENTS

| | | |
|---|---|---|
| 2012/0077064 A1 | 3/2012 | Sasakawa et al. |
| 2013/0234721 A1* | 9/2013 | Nakamura ............ H01M 2/105 324/434 |
| 2014/0023909 A1* | 1/2014 | Suzuki .................. H01M 2/206 429/158 |
| 2015/0291045 A1 | 10/2015 | Sugawara |

FOREIGN PATENT DOCUMENTS

| | | | |
|---|---|---|---|
| JP | 4499977 B2 | 7/2010 | |
| JP | 2012-89470 A | 5/2012 | |
| WO | WO 2012/014398 A1 | 2/2012 | |
| WO | WO20122067261 A1 * | 5/2012 | .......... H01M 10/425 |
| WO | WO2012131801 A1 * | 10/2012 | .......... H01M 2/1077 |
| WO | WO2013/186878 A1 | 12/2013 | |

OTHER PUBLICATIONS

Japanese Office Action, dated May 9, 2017, for corresponding Japanese Application No. 2013-176961.

* cited by examiner

BATTERY PACK

TECHNICAL FIELD

The present invention relates to a battery pack including a battery stack in which a plurality of laminar battery cells are stacked one on top of another.

BACKGROUND ART

Non-aqueous electrolyte batteries as typified by lithium ion secondary batteries have high energy density, and therefore they are used as power sources for various moving devices such as automobiles and motorbikes, portable personal digital assistant devices, uninterruptible power supply (UPS) apparatuses, and storage devices. For such applications, in order to further improve energy density, laminate type lithium ion secondary batteries in which a power generation element is sheathed with a flexible laminate sheet are often used. Furthermore, in order to obtain a desired battery capacity, battery stacks in which a plurality of laminar secondary batteries (battery cells) are stacked and connected in series are also in practical use (see, for example, Patent Document 1).

Such a battery stack in which a plurality of battery cells are stacked is housed in a case together with a circuit board to constitute a battery pack. The circuit board is provided with power lines for connecting the battery stack and external connection terminals, and a protection circuit. The protection circuit includes a current monitoring unit for monitoring the current of the power lines, a voltage monitoring unit for monitoring the voltage of the respective battery cells constituting the battery stack, and a control unit for outputting a signal for shutting off the power line when detecting an abnormality based on outputs from the current monitoring unit and the voltage monitoring unit. In conventional battery packs, the power lines and various functional components constituting the protection circuit are provided on one common board (see Patent Document 2).

PRIOR ART DOCUMENTS

Patent Documents

Patent Document 1: Japanese Patent No. 4499977
Patent Document 2: JP 2012-89470 A (paragraphs [0059]-[0070], FIGS. 10 and 11)

DISCLOSURE OF INVENTION

Problem to be Solved by the Invention

A demand for smaller yet larger capacity battery packs has been growing day by day, To meet this demand, it is necessary to increase the current flowing through the power lines while downsizing the board.

However, when the power lines formed on the board is widened so as to increase the current of the power lines, downsizing of the board becomes difficult. Further, when the current of the power lines is increased, a noise occurring from the power lines, which adversely affects a digital circuit constituting the voltage monitoring unit and the control unit, cannot be ignored.

The present invention has been made to solve the above problem encountered with the conventional battery packs and it is an object of the present invention to provide smaller yet larger capacity battery packs.

Means for Solving Problem

A battery pack of the present invention includes: a battery stack in which a plurality of laminar battery cells are stacked one on top of another and connected in series; a voltage monitoring unit that monitors a voltage of each of the plurality of battery cells; a power unit that has a power line for connecting the battery stack and an external connection terminal, a current monitoring unit for monitoring a current of the power line, and a switch for disconnecting the power line; and a control unit that receives signals from the voltage monitoring unit and the current monitoring unit, and outputs to the switch a signal for shutting off the power line. The power unit is provided on a power board separately from a board on which the voltage monitoring unit and the control unit are provided. Wiring formed on the power board is thicker than that formed on the board on which the voltage monitoring unit and the control unit are provided.

Effect of the Invention

In the present invention, since the power unit is provided on the power board separately from the board on which the voltage monitoring unit and the control unit are provided, it is possible to reduce an adverse effect of the noise occurring from the power lines exerted on the digital circuit constituting the voltage monitoring unit and the control unit. Further, since the wiring formed on the power board is thicker than that formed on the board on which the voltage monitoring unit and the control unit are provided, it is possible to send a large current to the power lines without widening the power lines. Moreover, since the wiring of the board on which the voltage monitoring unit and the control unit are provided does not need to be thickened more than necessary, it is possible to reduce the thickness of the board. As a result of these, it is possible to provide smaller yet larger capacity battery packs.

DESCRIPTION OF THE INVENTION

In the above battery pack of the present invention, it is preferable that the power board and the board on which the voltage monitoring unit and the control unit are provided are stacked. This preferable configuration is advantageous in further downsizing the boards as a whole.

The voltage monitoring unit and the control unit may be provided on different boards. This enables selection of a suitable board (e.g., multilayer board) for each of the voltage monitoring unit and the control unit, and enhances the degree of freedom in designing a wiring circuit and the arrangement of components. Therefore, this preferable configuration is advantageous in further downsizing the boards as a whole.

A lead that is electrically connected with an input and output tab of the battery stack may oppose the power board. In this case, it is preferable that a screw passes through the power board and the lead in this order and is screwed into a nut that is arranged on a side opposite the power board relative to the lead, so that the lead is electrically connected to the power line formed on the power board. In this preferable configuration, the lead and the power line are not electrically connected to each other until the screw is screwed into the nut. Therefore, in the assembly work of the battery pack, it is possible to reduce a possibility of an accident such as an electric shock or a short circuit during the assembly of the battery pack by performing the step of screwing the screw into the nut later.

In the above, it is preferable that the nut is housed in a cavity of a holding mechanism that is arranged on the side opposite the power board relative to the lead. Thereby, it is possible to perform the work of screwing the screw into the nut easily and efficiently.

It is preferable that the lead is spaced apart from the power line in a state where the screw is not screwed into the nut. Thus, it is possible to further reduce the possibility of an accident such as an electric shock or a short circuit during the assembly of the battery pack.

It is preferable that the nut is movable toward and away from the power board in a state where the screw is not screwed into the nut. Thereby, it is possible to easily realize a configuration in which the lead and the power line are electrically connected to each other by screwing the screw into the nut.

The battery pack may further include an upper lid that covers the power board. In this case, it is preferable that a through hole for inserting the screw is formed in the upper lid. Thereby, the step of screwing the screw into the nut can be performed as a final step after covering the power board with the upper lid in the assembly work of the battery pack. As a result, it is possible to further reduce the possibility of an accident such as an electric shock or a short circuit during the assembly of the battery pack.

Hereinafter, the present invention will be described in detail by way of preferred embodiments. Needless to say, the present invention is not limited to the following embodiments. For convenience of explanation, the respective drawings referred to herein are simplified drawings showing exclusively principal members necessary for explaining the present invention, among constituent members of the embodiments of the present invention. The present invention therefore possibly includes arbitrary members not shown in the drawings referred to hereinafter. The dimensions of the members shown in the following respective drawings do not faithfully represent the actual dimensions of the members and the actual dimension ratios of the members. Subscripts "p" and "n" attached to the reference numerals of the respective members mean "positive electrode" and "negative electrode", respectively, unless otherwise specified.

(Battery Cell)

A battery cell constituting a battery pack according to one embodiment of the present invention will be described.

Figure 1A:
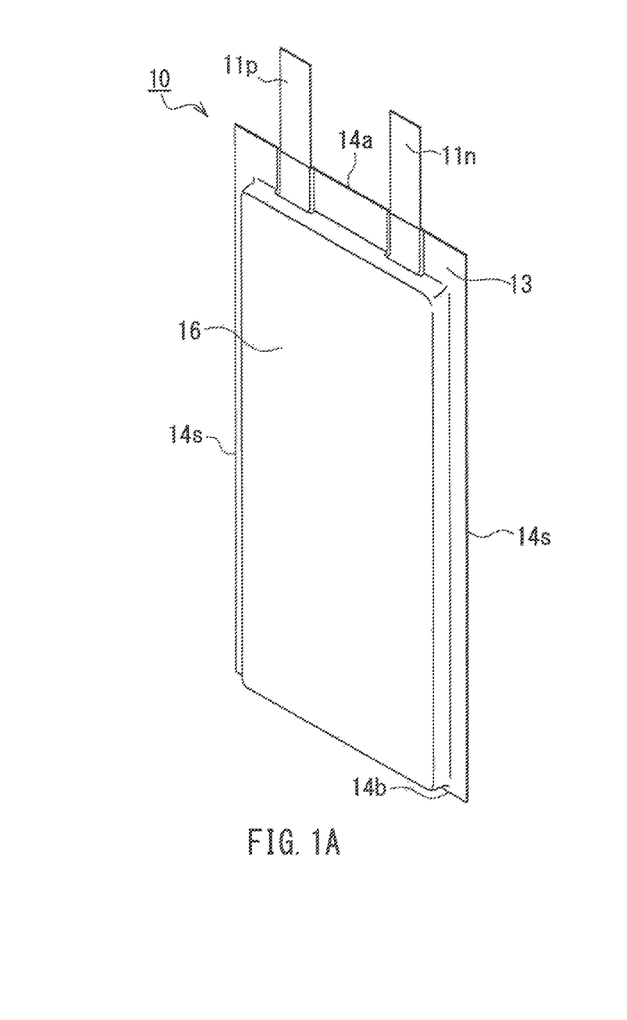
FIG. 1A is a perspective view of a battery cell constituting a battery pack according to one embodiment of the present invention seen from the front surface side.
Figure 1B:
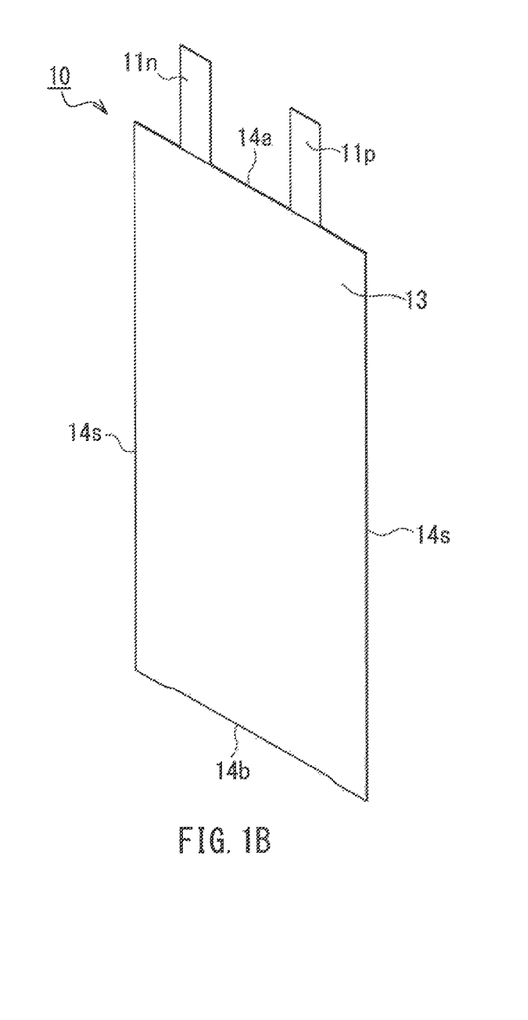
FIG. 1B is a perspective view of the same seen from the back surface side.

FIG. 1A is a perspective view of a battery cell 10 seen from the front surface side, and FIG. 1B is a perspective view of the same seen from the back surface side. The battery cell 10 has a substantially rectangular shape in a plan view, and has a laminar shape that is thin relative to the lengthwise and widthwise dimensions of the rectangular shape. In the battery cell 10, a laminar power generation element (not shown) having a substantially rectangular shape in a plan view is enclosed in an outer sheath made of a laminate sheet 13, together with an electrolyte. The power generation element is an electrode stack having positive electrodes and negative electrodes that are alternately stacked one on top of the other with separators interposed therebetween, the positive electrode having a positive electrode material mixture layer containing a positive electrode active material applied and formed on a predetermined region on each surface of a positive electrode current collector, and the negative electrode having a negative electrode material mixture layer containing a negative electrode active material applied and formed on a predetermined region on each surface of a negative electrode current collector. There is no particular limitation on the type of battery, but the type of battery can be secondary battery, and preferably lithium ion secondary battery.

The laminate sheet 13 is thinner than the power generation element and is flexible. The laminate sheet 13 may be, e.g., a flexible multilayer sheet in which a heat sealing resin layer (for example, modified polyolefin layer) is laminated on the surface, of a base layer made of aluminum or the like, that opposes the power generation element. A single rectangular laminate sheet 13 is folded in two along a lower end (one of the short sides) 14b so as to sandwich the power generation element, and put together and sealed along the other three sides except for the lower end 14b by a heat sealing method or the like.

A positive electrode tab 11p and a negative electrode tab 11n are drawn out from an upper end (the other short side) 14a that opposes the lower end 14b. The positive electrode tab 11p and the negative electrode tab 11n have a strip shape and extend in a direction perpendicular to the upper end 14a (in other words, the direction parallel to a pair of side ends (long sides) 14s that are adjacent to the upper end 14a). The positive electrode tab 11p is made of e.g., an aluminum sheet, and is electrically connected to a plurality of positive electrode current collectors (not shown) constituting the power generation element. Likewise, the negative electrode tab 11n is made of, e.g., a copper sheet, a copper sheet plated with nickel, a copper-nickel clad material or the like, and is electrically connected to a plurality of negative electrode current collectors (not shown) constituting the power generation element.

As shown in FIG. 1A, a rectangular region 16 corresponding to the power generation element is protruded from the sealed region of the laminate sheet 13 along three sides 14a, 14s, and 14s of the battery cell 10. The surface of the battery cell 10 from which the region 16 is protruded is referred to as the "front surface" of the battery cell 10. Meanwhile, the surface of the battery cell 10 opposite the front surface that is substantially flat as shown in FIG. 1B is referred to as the "back surface" of the battery cell 10.

The battery cell of the present invention is not limited to the configuration described above, and may be, e.g., a four-side sealed type battery cell in which the power generation element is sandwiched by two rectangular laminate sheets and sealing is performed along the four sides.

(Battery Stack)

Figure 2:
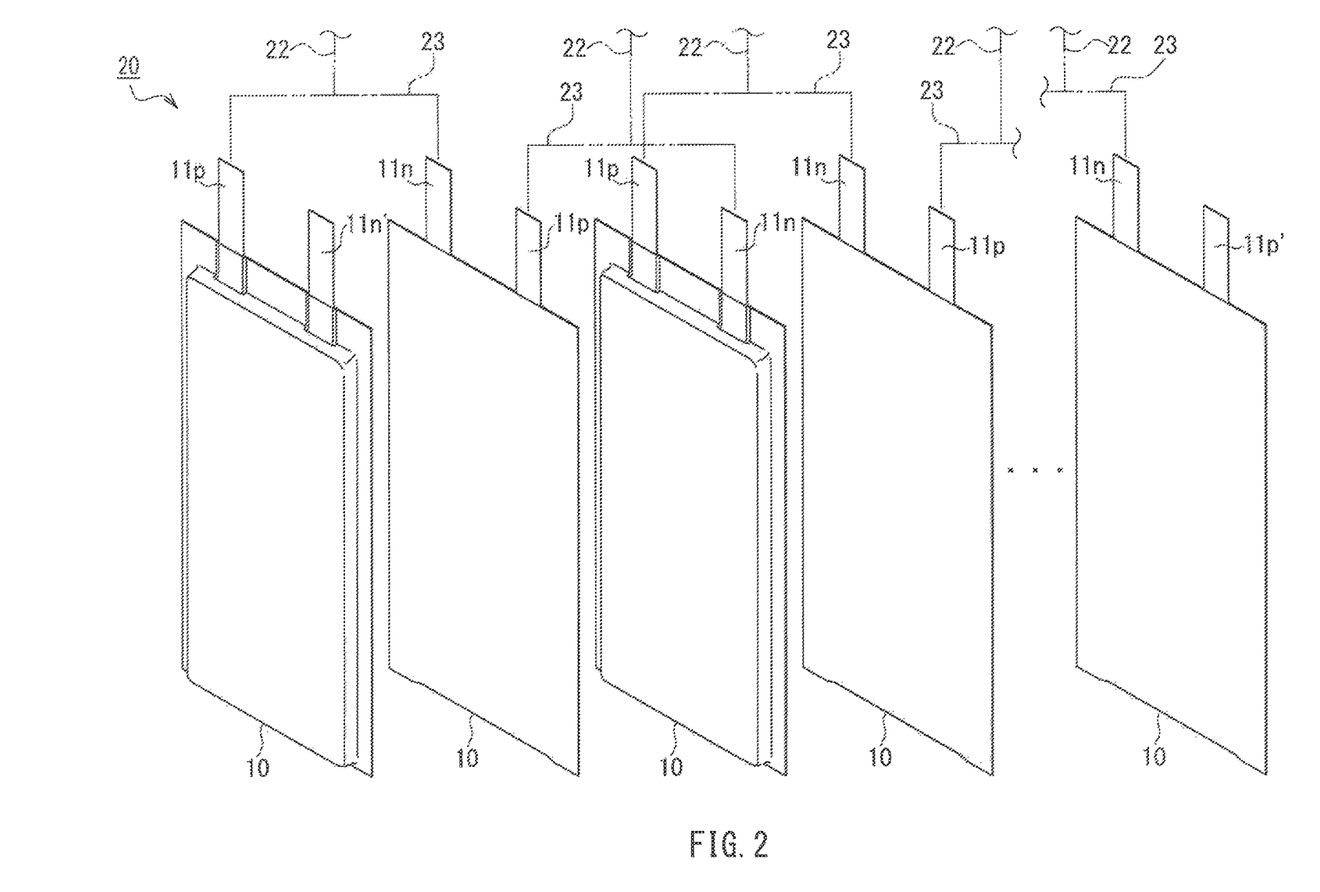
FIG. 2 is an exploded perspective view of a battery stack constituting the battery pack according to one embodiment of the present invention.

FIG. 2 is an exploded perspective view of a battery stack 20 constituting a battery pack according to one embodiment of the present invention. The battery stack 20 is composed of a plurality of the battery cells 10 stacked one on top of the other. The direction in which the battery cells 10 are stacked (lateral direction in FIG. 2) is referred to as the "stacked direction".

As shown in FIG. 2, every other battery cell 10 is reversed so that tabs of different polarities (namely, the positive electrode tab 11p and the negative electrode tab 11n) oppose each other in the stacked direction between the two adjacent battery cells 10. The positive electrode tab 11p and the negative electrode tab 11n that oppose each other in the stacked direction are electrically connected as indicated by a double-dot-dash line 23. As a result, a plurality of the battery cells 10 are connected in series. A voltage monitoring line 22 is connected to the positive electrode tab 11p and the negative electrode tab 11n that are connected to each other. A positive electrode tab 11p' and a negative electrode tab 11n' on the both ends of the battery stack 20 that are not connected with tabs of different polarities serve as input and output tabs that input and output electric power from and to the battery stack 20.

The battery cells 10 that are adjacent to each other in the stacked direction are integrated into one piece using, e.g., a double-sided adhesive tape. A thin plate (not shown) may be interposed between the adjacent battery cells 10. The number of the battery cells 10 constituting the battery stack 20 is determined appropriately.

(Battery Pack)

Figure 3:
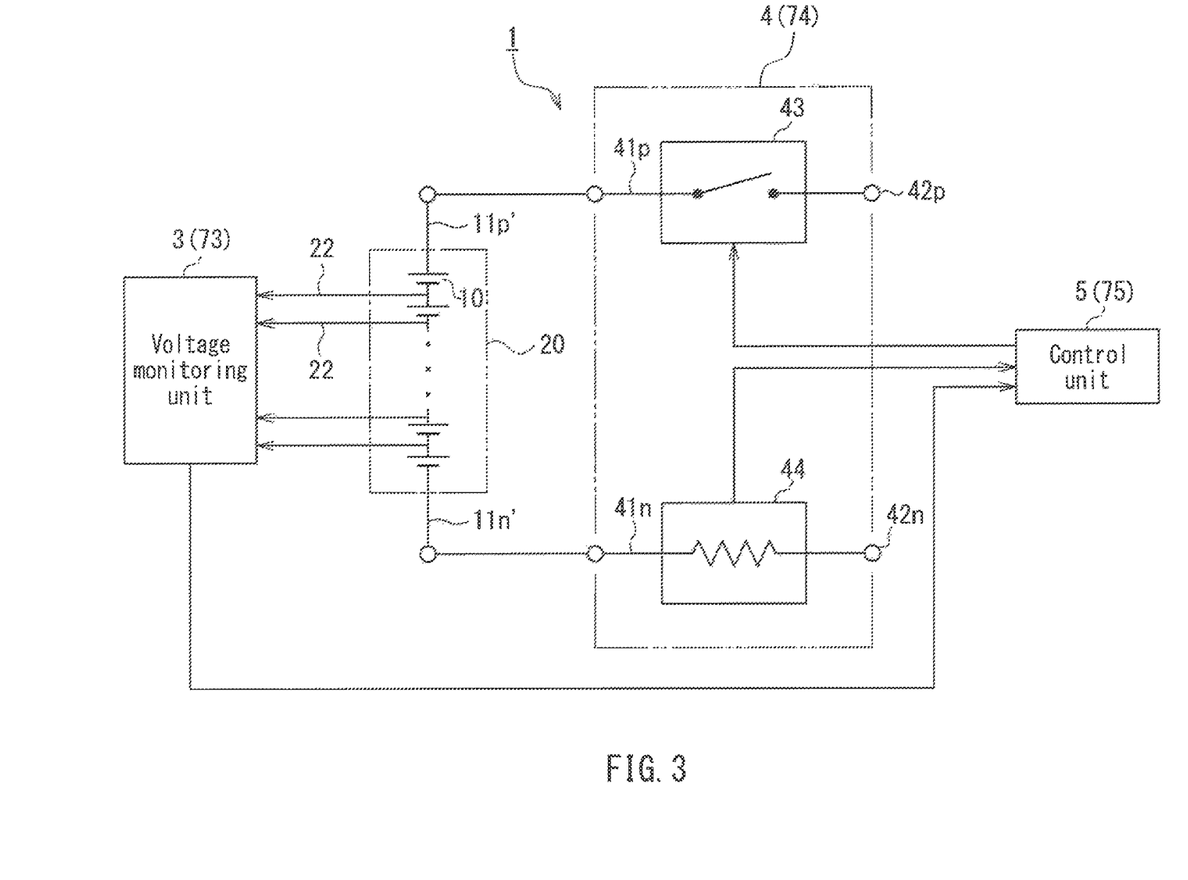
FIG. 3 is a block diagram showing a schematic configuration of the battery pack according to one embodiment of the present invention.

FIG. 3 is a block diagram showing a schematic configuration of a battery pack 1 according to one embodiment of the present invention.

A plurality of the voltage monitoring lines 22 (see FIG. 2) connected to the battery stack 20 are connected to a voltage monitoring unit 3.

The input and output tabs 11p' and 11n' of the battery stack 20 are connected via power lines 41p and 41n to external connection terminals 42p and 42n, respectively, that input and output electric power from and to the battery pack 1. A switch 43 that disconnects the positive electrode power line 41p is provided on the positive electrode power line 41p. A current monitoring unit 44 that monitors a current flowing through the negative electrode power line 41n is provided on the negative electrode power line 41n. The switch 43 includes a switch box that switches the electrical connection of the positive electrode power line 41p, and a driver circuit that drives the switch box. The current monitoring unit 44 may be provided on the positive electrode power line 41p, and the switch 43 may be provided on the negative electrode power line 41n unlike this embodiment. The switch 43 and the current monitoring unit 44 may be provided on either the positive electrode power line 41p or the negative electrode power line 41n. A power unit 4 is composed of the power lines 41p and 41n, the external connection terminals 42p and 42n, the switch 43, and the current monitoring unit 44.

The voltage monitoring unit 3 is connected to a control unit 5. When the control unit 5 detects an abnormality in the voltage of the battery cells 10 based on a signal from the voltage monitoring unit 3, it outputs to the switch 43 a signal for shutting off the power line 41p so as to shut off the electrical connection between the battery stack 20 and a device that is connected to the battery pack 1.

The current monitoring unit 44 is also connected to the control unit 5. When the control unit 5 detects the abnormality in the current flowing through the power line based on a signal from the current monitoring unit 44, it outputs to the switch 43 a signal for shutting off the power line 41p so as to shut off the electrical connection between the battery stack 20 and the external of the battery pack 1.

Although not illustrated, the voltage monitoring unit 3, the switch 43, the current monitoring unit 44, and the control unit 5 receive a power supply from the battery stack 20 to exhibit individual functions.

The following explains how the configuration shown in FIG. 3 is embodied in the actual battery pack 1.

Figure 4:
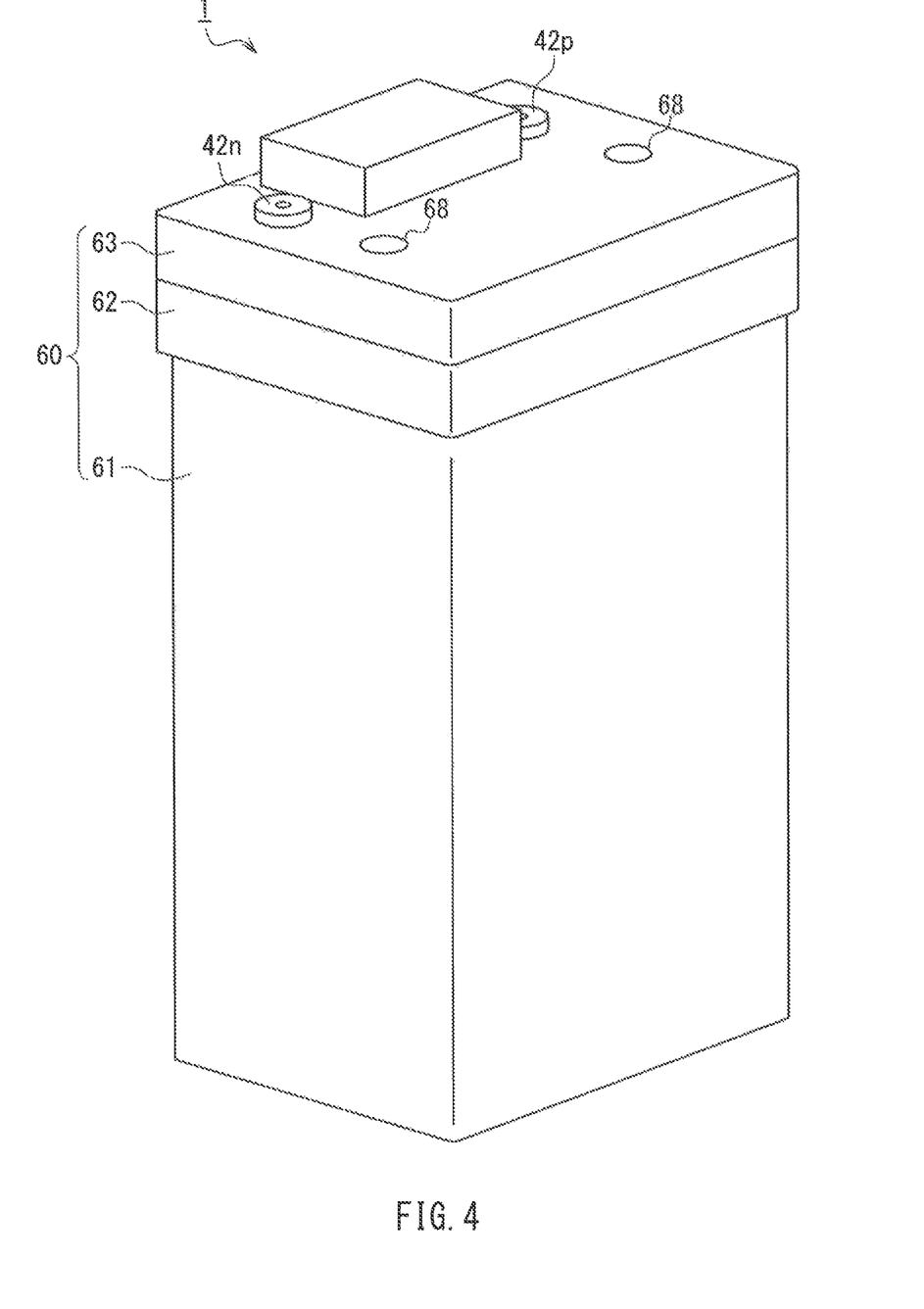
FIG. 4 is a perspective view of the battery pack according to one embodiment of the present invention.

FIG. 4 is a perspective view of the battery pack 1. The battery pack 1 has a case 60 that includes a case body 61, an intermediate frame 62, and an upper lid 63 in this order. The positive electrode external connection terminal 42p and the negative electrode external connection terminal 42n that input and output electric power from and to the battery pack 1 pass through through holes that are formed in a top surface of the upper lid 63.

Figure 5:
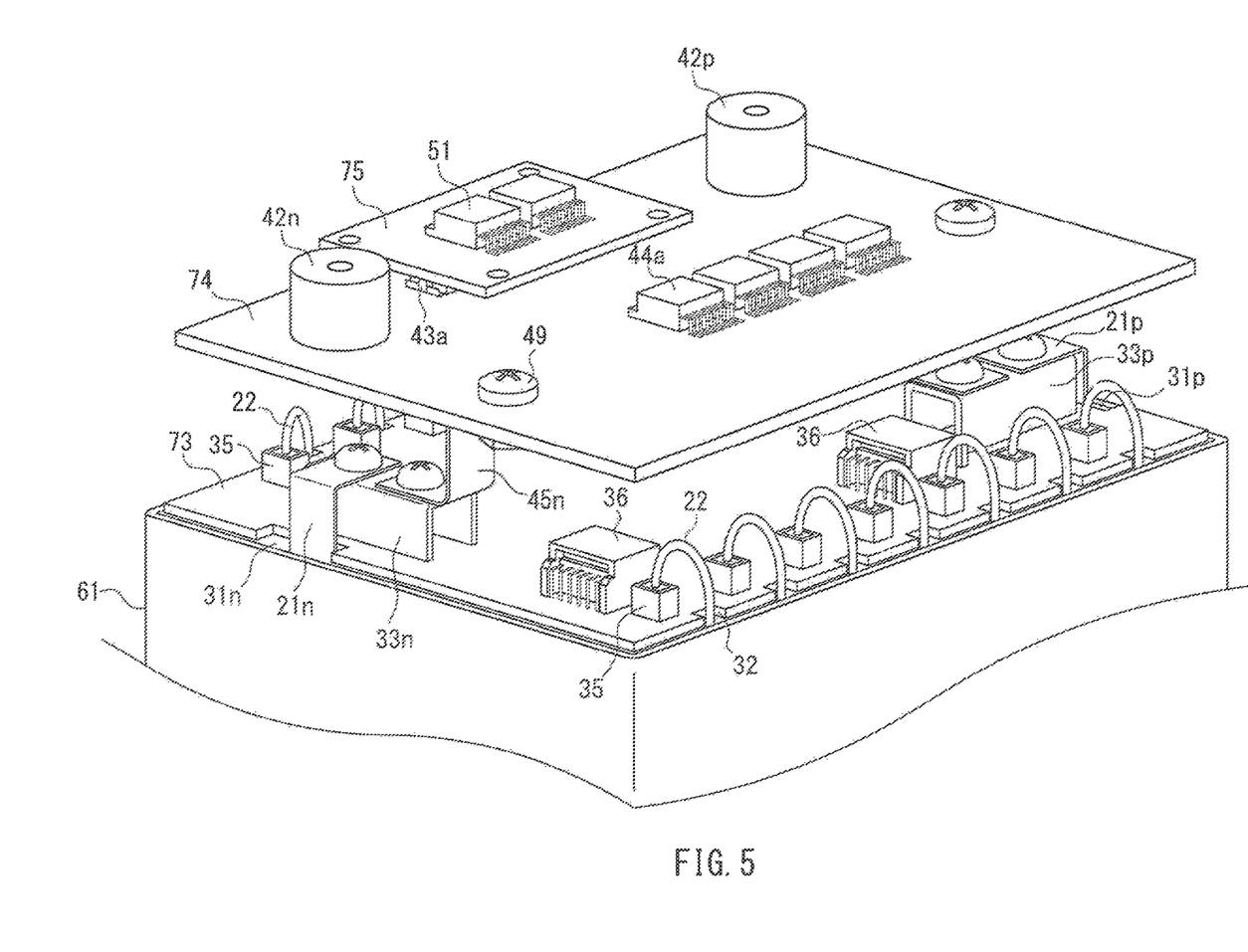
FIG. 5 is a transparent perspective view of principal members of the battery pack according to one embodiment of the present invention, showing the internal configuration of a cover and an intermediate frame.

FIG. 5 is a transparent perspective view of the principal members of the battery pack 1, showing the internal configuration of the upper lid 63 and the intermediate frame 62. The case body 61 has a substantially rectangular parallelepiped shape, and is a bottomed box with an open upper. The battery stack 20 (see FIG. 2) is housed in the case body 61. A voltage monitoring board 73 is fixed to the case body 61 so as to close the opening of the case body 61. A power board 74 and a control board 75 are arranged above the voltage monitoring board 73. The voltage monitoring unit 3, the power unit 4, and the control unit 5, which are explained in FIG. 3, are provided on the voltage monitoring board 73, the power board 74, and the control board 75, respectively.

The voltage monitoring board 73 has a substantially rectangular shape in a plan view. First notches 31p and 31n are formed on two opposing sides of the four sides of the voltage monitoring board 73, and a plurality of second notches 32 are formed on the other two opposing sides.

Strip-shaped electrode leads 21p and 21n that respectively are connected to the input and output tabs 11p' and 11n' (see FIG. 2) of the battery stack 20 are guided from the lower side (battery stack 20 side) of the voltage monitoring board 73 to the upper side through a pair of the first notches 31p and 31n. The electrode leads 21p and 21n are fixed to terminal blocks 33p and 33n, respectively, that are mounted on the voltage monitoring board 73. One ends of strip-shaped connection leads 45p and 45n (the positive electrode connection lead 45p cannot be seen in FIG. 5) are connected to the terminal blocks 33p and 33n. Thus, the connection leads 45p and 45n are electrically connected with the electrode leads 21p and 21n via the terminal blocks 33p and 33n. The other ends of the connection leads 45p and 45n are connected electrically to the power board 74 (see FIG. 8 to be described later).

The second notches 32 are formed at a substantially constant pitch along the sides of the electrode monitoring board 73. Terminals 35 are mounted on the electrode monitoring board 73 in the vicinity of the second notches 32. A plurality of the terminals 35 are provided so as to correspond to the second notches 32 one to one. Through each second notch 32, one voltage monitoring line 22 (see FIG. 2) that is connected to the battery stack 20 is guided from the lower side (battery stack 20 side) of the voltage monitoring board 73 to the upper side. The line 22 is connected to the terminal 35 that corresponds to the second notch 32 through which said line 22 is guided.

A voltage monitoring circuit (e.g., IC) 36 for monitoring the voltage of each of the battery cells 10 constituting the battery stack 20 is mounted on the voltage monitoring board 73. The voltage monitoring circuit 36 is connected to a plurality of the terminals 35 via lines (not shown) that are formed on the voltage monitoring board 73. The voltage monitoring circuit 36 constitutes the voltage monitoring unit 3 (see FIG. 3) that monitors the voltage of each of the battery cells 10.

The power board 74 is arranged above the voltage monitoring board 73 so as to be spaced apart from the voltage monitoring board 73. The external connection terminals 42$p$ and 42$n$ (see FIG. 3) that input and output electric power from and to the battery pack 1 are mounted on the power board 74. The power lines 41$p$ and 41$n$ (not illustrated in FIG. 5, see FIG. 3) that respectively connect the connection leads 45$p$ and 45$n$ and the external connection terminals 42$p$ and 42$n$ are formed on the surface of or inside the power board 74. Further, a switch circuit (e.g., IC) 43$a$ constituting the switch 43 (see FIG. 3) and a current monitoring circuit (e.g., IC) 44$a$ constituting the current monitoring unit 44 (see FIG. 3) are mounted on the power board 74.

The control board 75 is arranged above the power board 74 so as to be spaced apart from the power board 74. A control circuit (e.g., IC) 51 constituting the control unit 5 (see FIG. 3) is mounted on the control board 75.

The voltage monitoring board 73, the power board 74, and the control board 75 are connected electrically with each other using flexible cables (not shown).

(Effects)

Effects of the battery pack 1 of this embodiment will be described in comparison with conventional battery packs.

As described above, there is a growing demand for smaller yet larger capacity battery packs recently. To increase the capacity of battery packs, it is necessary to increase the current of the power lines that connect the battery stack and the external connection terminals. This, however, increases a noise occurring from the power lines. In the conventional battery packs, since the power lines and the protection circuit including the voltage monitoring unit and the control unit are provided on the same board, there is a possibility that the noise from the power lines adversely affects a digital circuit constituting the voltage monitoring unit and the control unit. In order to avoid such an adverse effect of the noise, the power lines should be spaced apart from the voltage monitoring unit and the control unit. However, such a configuration increases the area of the board, making it difficult to downsize the battery packs.

On the other hand, in the battery pack 1 of this embodiment, the power unit 4 that includes the power lines 41$p$ and 41$n$ is provided on the power board 74 separately from the voltage monitoring board 73 on which the voltage monitoring unit 3 is provided and the control board 75 on which the control unit 5 is provided. This makes it possible to easily increase a distance from the power unit 4 to the voltage monitoring unit 3 and the control unit 5. As necessary, a shield may be provided between the power unit 4, and the voltage monitoring unit 3 and control unit 5. As a result, it is possible to reduce the possibility that the noise from the power unit 4 adversely affects the digital circuit constituting the voltage monitoring unit 3 and the control unit 5.

Dividing a board into a plurality of boards enhances the degree of freedom in designing the arrangement of lines to be formed on respective boards and components to be mounted on respective boards. This is advantageous in downsizing the boards as a whole, as compared with conventional configurations using a single board.

So-called multilayer boards in which lines of plural layers (wiring pattern) are formed in a predetermined pattern on the surfaces or inside are generally used as boards of battery packs. In the multilayer board, each layer generally has the same wiring thickness (size along a direction vertical to the surface of the board). In the conventional battery packs, the power lines and the protection circuit including the voltage monitoring unit and the control unit are provided on the same board. When a multilayer board with thick wiring is used to increase the current of the power lines, such thick wiring is useless for the voltage monitoring unit and the control unit, and thickens the multilayer board. Meanwhile, when a multilayer board with wide wiring is used to increase the current of the power lines, the area of the board increases.

On the other hand, in the battery pack 1 of this embodiment, the power unit 4 that includes the power lines 41$p$ and 41$n$ is provided on the power board 74 separately from the voltage monitoring board 73 on which the voltage monitoring unit 3 is provided and the control board 75 on which the control unit 5 is provided. Therefore, it is possible to use an optimal multilayer board for each of the boards 73, 74, and 75. For example, in order to increase the current of the power lines 41$p$ and 41$n$, a multilayer board with thick wiring can be used as the power board 74. This prevents the wiring width (size along a direction parallel to the surface of the board) from being increased, and accordingly avoids the area of the board from being increased. Meanwhile, multilayer boards with relatively thin and narrow wiring can be used as the voltage monitoring board 73 and the control board 75 that do not require a large current. Thus, it is possible to reduce the thickness and the area of the boards 73 and 75. In one example, the power board 74 may be, e.g., a multilayer board having a whole thickness of 2.3 mm with 300 μm-thick wiring, the voltage monitoring board 73 may be, e.g., a two-layer board having a whole thickness of 1.5 mm with 35 μm-thick wiring, and the control board 75 may be, e.g., a six-layer board having a whole thickness of 1.5 mm with 35 μm-thick wiring.

As described above, in this embodiment, the power unit 4 is provided on the power board 74 separately from the boards 73 and 75 on which the voltage monitoring unit 3 and the control unit 5 are provided, respectively, and wiring formed on the power board 74 is thicker than that formed on the boards 73 and 75 on which the voltage monitoring unit 3 and the control unit 5 are provided, respectively. This enables production of smaller yet larger capacity battery packs 1.

Moreover, stacking the three boards 73, 74, and 75 can make the boards 73, 74, and 75 as a whole more compact while avoiding the aforementioned noise problem. The order of stacking the boards 73, 74, and 75 is not limited to the above embodiment, and may be changed appropriately.

Furthermore, dividing the protection circuit into a plurality of portions depending on the function and mounting them on the different boards enables the respective portions of the protection circuit to be modularized. Such a modularization makes it easier to partially change the design of and partially replace a board among a plurality of boards constituting the protection circuit, and thus corresponds to production of various kinds of battery packs easily. Further, the protection circuit can be repaired by only changing a part of the boards.

(Connection between Battery Stack and Power Line)

At any one of stages in the assembly of the battery pack 1, it is necessary to perform a step of electrically connecting the input and output tabs $11p'$ and $11n'$ of the battery stack 20 (see FIG. 2) with the power lines $41p$ and $41n$ (see FIG. 3) (hereinafter, referred to as a "battery-power board connection step"). Performing the battery-power board connection step at an early stage increases the possibility of an accident such as an electric shock or a short circuit during the following assembly steps. The damage by such an accident can be serious when the capacity (voltage) of the battery stack 20 is large. Further, the use of a plurality of boards as in this embodiment complicates the assembly steps of the battery pack 1, and raises the possibility of such an accident.

The battery pack 1 of this embodiment is configured to reduce the possibility of such an accident. The following describes the configuration.

The battery pack 1 of this embodiment is assembled through the following steps in this order (not detailed); (1) the battery stack 20 is housed in the case body 61; (2) the voltage monitoring board 73 is fixed to the case body 61, and the battery stack 20 and the voltage monitoring board 73 are connected electrically; (3) the intermediate frame 62 is fixed to the case body 61; (4) the power board 74 is fixed to the intermediate frame 62; and (5) the upper lid 63 to which the control board 75 is attached is fixed to the intermediate frame 62.

Figure 6:
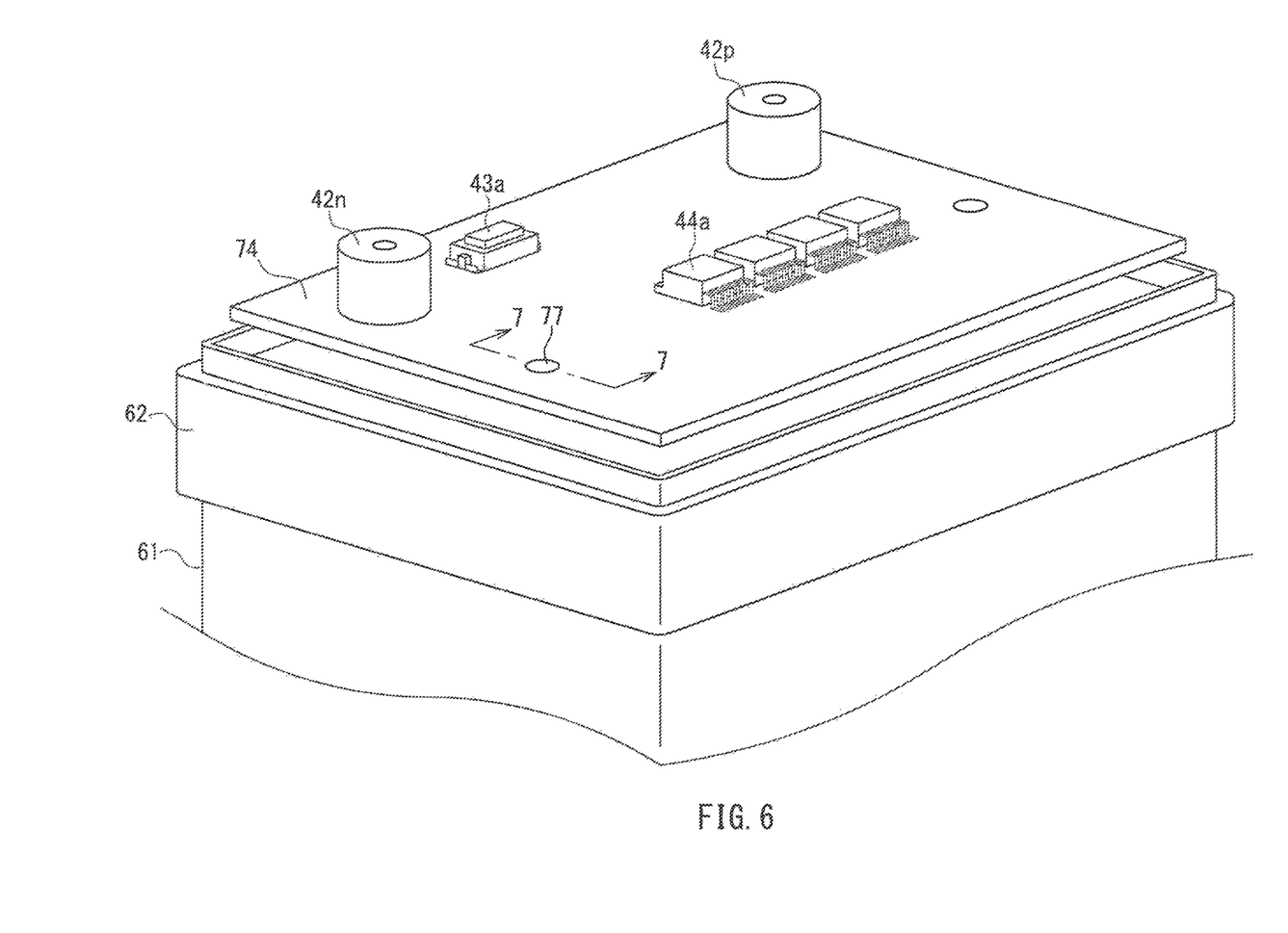
FIG. 6 is a perspective view showing a state in which a power board is fixed to the intermediate frame in the assembly of the battery pack according to one embodiment of the present invention.
Figure 7:
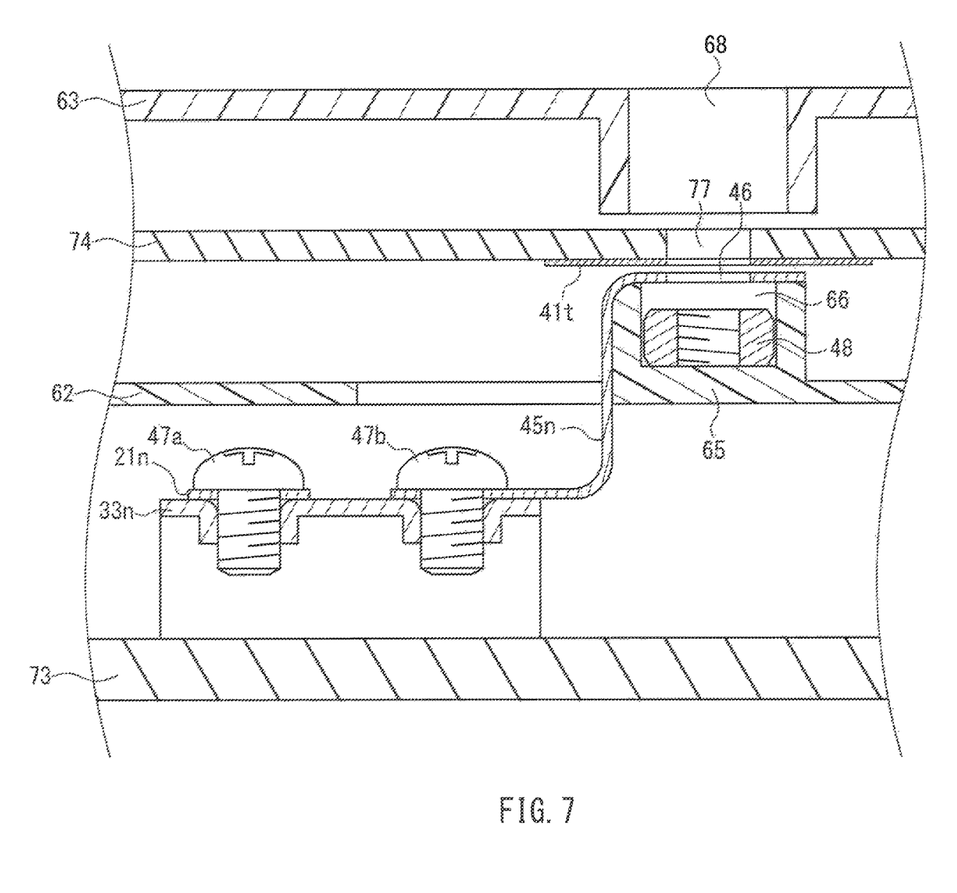
FIG. 7 is a cross-sectional arrow view taken along a cross section that corresponds to a vertical plane including a line 7-7 of FIG. 6, showing a state immediately before a battery-power board connection step in the assembly of the battery pack according to one embodiment of the present invention.

FIG. 6 is a perspective view showing a state in which the power board 74 is fixed to the intermediate frame 62 (step (4) above) in the aforementioned assembly. After this, the upper lid 63 is fixed to the intermediate frame 62 so as to cover the power board 74 (step (5) above). FIG. 7 is a cross-sectional arrow view taken along a cross section that corresponds to a vertical plane including a line 7-7 of FIG. 6, showing a state in which the upper lid 63 is fixed. For simplification of the drawing, members present behind the cross section are not illustrated in FIG. 7.

As shown in FIG. 7, the terminal block $33n$ having conductivity is mounted on the voltage monitoring board 73. The electrode lead $21n$ that is connected to the input and output tab $11n'$ of the battery stack 20 (see FIG. 2) is tightly fixed to the terminal block $33n$ with a screw $47a$. The lower end of the connection lead $45n$, which is folded into a substantially Z shape, is tightly fixed to the terminal block $33n$ with a screw $47b$. Thus, the electrode lead $21n$ and the connection lead $45n$ are connected electrically via the terminal block $33n$. The terminal block $33n$ may be insulative. In this case, a conductive layer is formed on the upper surface of the terminal block $33n$ so as to electrically connect the electrode lead $21n$ and the connection lead $45n$ via the conductive layer.

The intermediate frame 62 has a holding portion 65 in the vicinity of the terminal block $33n$. The holding portion 65 has a bottomed box shape with an open upper, and holds a nut 48 in its cavity 66. In the cavity 66, the nut 48 is movable in the vertical direction (direction toward and away from the power board 74). The upper end of the connection lead $45n$ extends in the horizontal direction so as to close the opening of the holding portion 65. In the upper end of the connection lead $45n$, a through hole 46 that penetrates the connection lead $45n$ is formed at a position substantially coaxial with the nut 48. Also in the power board 74, a through hole 77 that penetrates the power board 74 is formed at a position substantially coaxial with the nut 48. A line terminal $41t$ made of a conductive metal is formed on the lower surface of the power board 74 in a region that opposes the upper end of the connection lead $45n$. The line terminal $41t$ surrounds the opening of the through hole 77. The line terminal $41t$ constitutes a part of the power line $41n$ (see FIG. 3). The line terminal $41t$ is spaced apart from the connection lead $45n$. The upper lid 63 covers the power board 74. A through hole 68 that penetrates the upper lid 63 is formed in the upper lid 63 at a position substantially coaxial with the nut 48.

Figure 8:
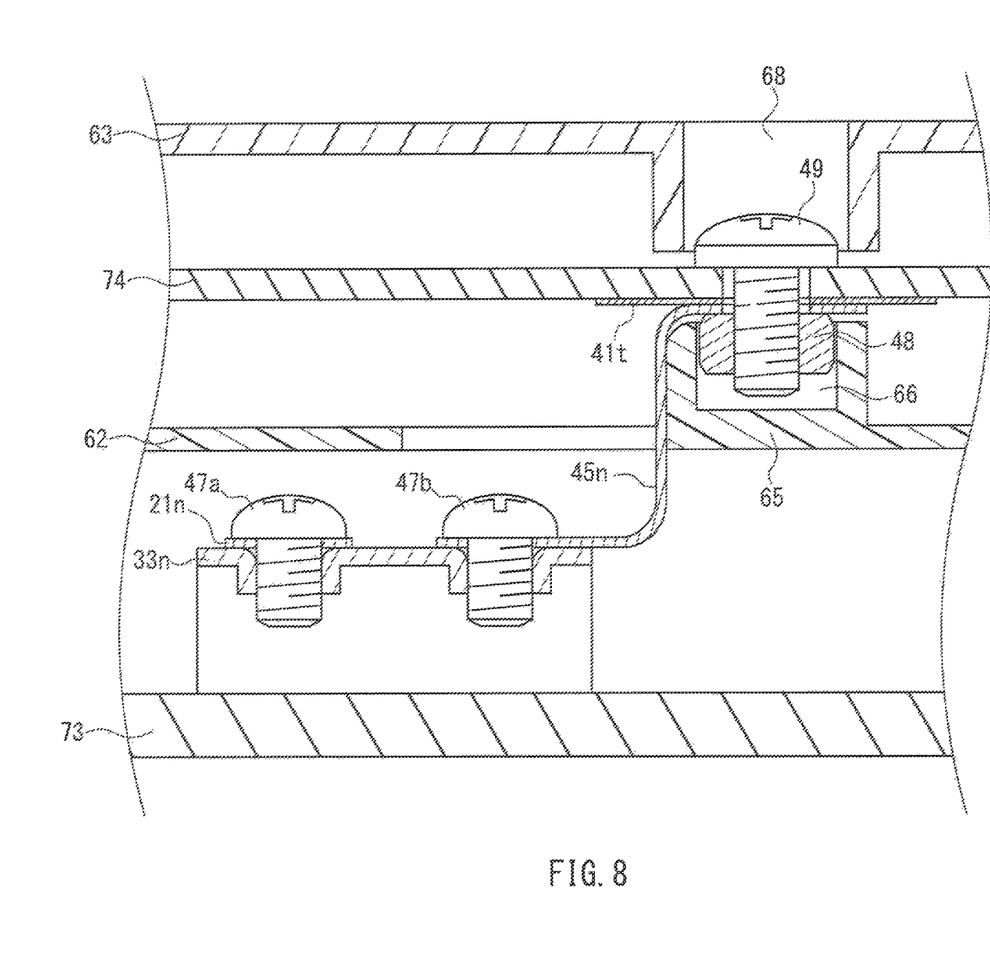
FIG. 8 is a cross-sectional view showing a state after the battery-power board connection step in FIG. 7.

In the case of performing the battery-power board connection step for connecting the input and output tab $11n'$ of the battery stack 20 and the power line $41n$, a screw 49 is inserted from above into the through hole 68 formed in the upper lid 63 (see FIG. 8). The screw 49 passes through the through hole 68 of the upper lid 63, the through hole 77 of the power board 74, and the through hole 46 of the connection lead $45n$ in this order, and is screwed into the nut 48 that is held in the holding portion 65. Since the regular hexagonal cylindrical surfaces of the outer circumference of the nut 48 come into contact with the inner circumferential surface of the cavity 66 of the holding portion 65, the rotation of the nut 48 is blocked. The nut 48 is lifted upward as the screw joint between the screw 49 and the nut 48 proceeds, and the connection lead $45n$ is lifted up accordingly. Finally, as shown in FIG. 8, the screw 49 is engaged with the nut 48 firmly. Thus, the connection lead $45n$ and the line terminal $41t$ of the power line $41n$ contact closely with each other and are connected electrically, and the battery-power board connection step is completed.

Although the above explanation relates to the electrical connection between the input and output tab of the battery stack 20 and the power line on the negative electrode side, the electrical connection on the positive electrode side is performed in the same manner as above.

Thus, in this embodiment, the connection leads $45p$ and $45n$, which are in electrical conduction with the input and output tabs $11p'$ and $11n'$ of the battery stack 20, are not to be electrically connected with the power lines $41p$ and $41n$ only by attaching the upper lid 63 to the intermediate frame 62. The battery-power board connection step is completed by inserting the screw 49 into the through hole 68 from above the upper lid 63 and screwing it into the nut 48 that is held on the lower side of the power board 74. In this embodiment, the boards 73, 74, and 75 can be installed in a state of not being electrically connected to the input and output tabs $11p'$ and $11n'$ of the battery stack 20. The battery-power board connection step is performed after fixing the upper lid 63, that is, the step is performed as a final step of the assembly work of the battery pack 1. As a result, it is possible to reduce the possibility of an accident such as an electric shock or a short circuit during the installation work of the boards 73, 74, and 75. As necessary, the through hole 68 of the upper lid 63 may be closed after the battery-power board connection step by attaching a label on the upper lid 63, inserting a plug in the through hole 68, or the like.

In this embodiment, the nut 48 is held in the cavity 66 of the holding portion 65 so as to be movable in the vertical direction before screw joint with the screw 49. This configuration is obtained by placing the nut 48 in the cavity 66 of the holding portion 65 prior to attaching the power board 74 to the intermediate frame 62. Since the nut 48 is held by the holding portion 65, the screw 49 can be easily screwed into the nut 48 by inserting the screw 49 into the through hole 77 of the power board 74 and rotating the screw 49. Thus, the battery-power board connection step can be performed efficiently.

The above embodiment is merely illustrative. The present invention is not limited to the above embodiment, and can be changed variously.

For example, the above embodiment describes the case in which the voltage monitoring unit 3 and the control unit 5 are stacked in the vertical direction. However, these may be arranged along the same horizontal plane. The voltage monitoring unit 3 and the control unit 5 may be provided on a common board, not on different boards. Further, at least one of the voltage monitoring unit 3, the power unit 4, and the control unit 5 may be divided into two or more, and they are provided on different boards.

The above embodiment describes the case in which the input and output tabs 11p' and 11n' of the battery stack 20 are connected to the power lines 41p and 41n via the electrode leads 21p and 21n and the connection leads 45p and 45n. However, either one or both of the electrode leads 21p and 21n and the connection leads 45p and 45n may be omitted. Alternatively, members in addition to these may be interposed further between the input and output tabs 11p' and 11n' and the power lines 41p and 41n.

The above embodiment describes the case in which the terminal blocks 33p and 33n provided on the voltage monitoring board 73 are interposed between the input and output tabs 11p' and 11n' and the power lines 41p and 41n. However, the terminal blocks 33p and 33n may be omitted and instead the electrode leads 21p and 21n (or any leads that are in electrical conduction with the input and output tabs 11p' and 11n') may be connected to the power lines 41p and 41n of the power board 74.

The holding portion 65 that holds the nut 48 does not need to be provided on the intermediate frame 62. For example, the holding portion 65 may be provided on the voltage monitoring board 73 or the power board 74. The holding portion 65 may be omitted and instead the screw 49 is screwed into the nut 48 while a worker holds the nut 48.

The protection circuit of the battery pack may further include a temperature monitoring unit that monitors the temperature of the battery cells. In this case, the control unit 5 can be configured to output to the switch 43 a signal for shutting off the power line when detecting an abnormality in the temperature of the battery cell based on a signal from the temperature monitoring unit, and shut off the electrical connection between the battery stack 20 and the external of the battery pack 1. Such a temperature monitoring unit is provided preferably on a board other than the power board 74.

The configuration of the case is not limited to the above embodiment, and determined appropriately. For example, the intermediate frame 62 may be omitted.

The upper lid 63 may not have the through hole 68 for inserting the screw 49. In this case, the battery-power board connection step can be performed immediately before the step of fixing the upper lid 63 to the intermediate frame 62 (step (5) above). Also in this case, the battery-power board connection step can be performed after completion of all the electrical connections necessary in the assembly of the battery pack 1 except for the connection between the connection leads 45p and 45n and the power lines 41p and 41n. Thus, installation of the boards 73, 74, and 75 can be performed in a state of not being electrically connected to the input and output tabs 11p' and 11n' of the battery stack 20 until right before the battery-power board connection step. As a result, it is possible to reduce the possibility of an accident such as an electric shock or a short circuit during the installation work of the boards 73, 74, and 75.

In the above embodiment, the control board 75 is attached to the upper lid 63. However, the present invention is not limited to this, and the control board 75 may be fixed to the power board 74. In this case, the control board 75 is fixed to the power board 74, and then the upper lid 63 is fixed to the fixing frame 62 so as to cover the control board 75 and the power board 74.

In the above explanation, the vertical direction and the horizontal direction of the battery pack 1 are described with the upper lid 63 side defined as the upper side of the battery pack 1 and the case body 61 side defined as the lower side of the battery pack 1. However, this is merely for convenience of explanation. The orientation of the battery pack in actual use is not limited to this.

INDUSTRIAL APPLICABILITY

There is no particular limitation on the application field of the present invention, and the present invention can be widely used as a battery pack for use in a power source for various moving devices such as automobiles, motorbikes and electric power-assisted bicycles, personal digital assistant devices, uninterruptible power supply (UPS) apparatuses, and storage devices.

DESCRIPTION OF REFERENCE NUMERALS 1 battery pack
3 voltage monitoring unit
4 power unit
5 control unit
10 battery cell
11p', 11n' input and output tab
20 battery stack
22 voltage monitoring line
41p, 41n power line
42p, 42n external connection terminal
43 switch
44 current monitoring unit
45p, 45n connection lead (lead)
48 nut
49 screw
63 upper lid
65 holding portion (holding mechanism)
66 cavity
68 through hole
73 voltage monitoring board
74 power board
75 control board

The invention claimed is:
1. A battery pack, comprising:
a battery stack in which a plurality of laminar battery cells are stacked one on top of another and connected in series;
a voltage monitoring unit that monitors a voltage of each of the plurality of battery cells;
a power unit that has a power line for connecting the battery stack and an external connection terminal, a current monitoring unit for monitoring a current of the power line, and a switch for disconnecting the power line; and
a control unit that receives signals from the voltage monitoring unit and the current monitoring unit, and outputs to the switch a signal for shutting off the power line, wherein the power unit is provided on a power board arranged above and apart from a voltage monitoring board on which the voltage monitoring unit is provided, the control unit is provided on a control board arranged above and apart from the power board, wiring formed on the power board is thicker than that formed on the voltage monitoring board and that formed on the control board, the battery stack (20) is arranged below the power board (74), a lead (45*n*) that is electrically connected with an input and output tab (11*n*') of the battery stack (20) faces a lower surface of the power board (74), a nut (48) faces a lower surface of the lead (45*n*), and a screw (49) passes through the power board (74) and the lead (45*n*) downward in this order and is screwed into the nut (48), so that the lead (45*n*) is sandwiched between the power board (74) and the nut (48) and electrically connected to the power line (41*t*) that is formed on the lower surface of the power board (74).

2. The battery pack according to claim 1, wherein the power board and the voltage monitoring board and the control board are stacked.

3. The battery pack according to claim 1, wherein the nut is housed in a cavity of a holding mechanism that is arranged on the side opposite the power board relative to the lead.

4. The battery pack according to claim 1, wherein the lead is spaced apart from the power line in a state where the screw is not screwed into the nut.

5. The battery pack according to claim 1, wherein the nut is movable toward and away from the power board in a state where the screw is not screwed into the nut.

6. The battery pack according to claim 1, further comprising an upper lid that covers the power board,
wherein a through hole for inserting the screw is formed in the upper lid.

7. The battery pack according to claim 1, wherein the lead (45*n*) does not pass through the power board (74).

* * * * *